United States Patent
Lucas et al.

(10) Patent No.: US 7,819,024 B1
(45) Date of Patent: Oct. 26, 2010

(54) APPARATUS AND METHODS FOR MANAGING EQUIPMENT STABILITY

(75) Inventors: Bruce C. Lucas, Marlow, OK (US); Steve Crain, Duncan, OK (US); Glenn H. Weightman, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

(21) Appl. No.: 12/422,450

(22) Filed: Apr. 13, 2009

(51) Int. Cl.
*G01D 7/00* (2006.01)
(52) U.S. Cl. .................................. 73/862.041
(58) Field of Classification Search ............ 73/862.324, 73/862.041–862.046, 862.628, 862.381, 73/865.4, 862.642; 702/42; 340/686.1
See application file for complete search history.

(56) References Cited

U.S. PATENT DOCUMENTS

| | | |
|---|---|---|
| 1,730,173 A | 10/1929 | Stearns |
| 2,795,403 A | 6/1957 | Mead ............................ 259/4 |
| 2,821,854 A | 2/1958 | Franke |
| 3,155,248 A | 11/1964 | Haller ......................... 214/38 |
| 3,291,234 A | 12/1966 | Woodburn |
| 3,381,943 A | 5/1968 | Miller ........................ 259/148 |
| 3,547,291 A | 12/1970 | Batterton et al. ............ 214/515 |
| 3,587,760 A | 6/1971 | Othmar et al. |
| 3,687,319 A | 8/1972 | Adam et al. ................ 214/501 |
| 3,792,790 A | 2/1974 | Brubaker .................... 214/501 |
| 3,854,540 A | 12/1974 | Holmstrom, Jr. |
| 3,857,452 A | 12/1974 | Hartman |
| 3,893,655 A | 7/1975 | Sandiford ...................... 259/4 |
| 3,931,999 A | 1/1976 | McCain ........................ 302/14 |
| 3,934,739 A | 1/1976 | Zumsteg et al. ............. 214/501 |
| 4,063,605 A | 12/1977 | Graham |
| 4,103,752 A | 8/1978 | Schmidt |
| 4,163,626 A | 8/1979 | Batterton et al. ............ 414/469 |
| 4,187,047 A | 2/1980 | Squifflet ..................... 414/332 |
| 4,249,838 A | 2/1981 | Harvey et al. ................. 406/51 |

(Continued)

FOREIGN PATENT DOCUMENTS

DE 37 17 417 A1 12/1988

(Continued)

OTHER PUBLICATIONS

U.S. Appl. No. 11/741,509, filed Apr. 27, 2007, Crain.

(Continued)

*Primary Examiner*—Jewel Thompson
(74) *Attorney, Agent, or Firm*—John W. Wustenberg; Baker Botts L.L.P.

(57) ABSTRACT

Apparatus and methods for determining the instability of equipment by measuring the reaction forces at different points at the base of the equipment are disclosed. A plurality of load sensors are symmetrically arranged at the base of the equipment. A Cartesian coordinate system is then imposed on the base of the equipment with the center of the base being the origin of the Cartesian coordinate system. The X-axis and the Y-axis of the Cartesian coordinate system are arranged to define a plane corresponding to the base of the equipment. Each load sensor is then designated with Cartesian coordinates and the reaction force at each load sensor is determined. An overall instability factor for the equipment is then determined from the Cartesian coordinates of each load sensor and the reaction force at that load sensor.

20 Claims, 2 Drawing Sheets

U.S. PATENT DOCUMENTS

| | | | |
|---|---|---|---|
| 4,345,628 A | 8/1982 | Campbell et al. | |
| 4,411,327 A | 10/1983 | Lockery et al. | 177/211 |
| 4,465,420 A | 8/1984 | Dillman | 414/332 |
| 4,621,972 A | 11/1986 | Grotte | 414/477 |
| 4,634,335 A | 1/1987 | Van den Pol | 414/494 |
| 4,683,354 A * | 7/1987 | Phillips | 200/61.41 |
| 4,726,435 A | 2/1988 | Kitagawa et al. | 177/187 |
| 4,775,275 A | 10/1988 | Perry | 414/21 |
| 4,819,750 A | 4/1989 | Carnevale | 177/256 |
| 4,844,189 A | 7/1989 | Shisgal et al. | 177/211 |
| 5,127,450 A | 7/1992 | Saatkamp | |
| 5,133,212 A | 7/1992 | Grills et al. | |
| 5,161,628 A | 11/1992 | Wirth | |
| 5,205,370 A | 4/1993 | Paul et al. | |
| 5,343,000 A | 8/1994 | Griffen et al. | 177/145 |
| 5,452,615 A * | 9/1995 | Hilton | 73/862.043 |
| 5,578,798 A | 11/1996 | Nuyts | |
| 5,635,680 A | 6/1997 | Dojan | |
| 5,637,837 A | 6/1997 | Merz et al. | |
| 5,665,910 A | 9/1997 | Knutson et al. | |
| 5,717,167 A | 2/1998 | Filing et al. | |
| 5,764,522 A | 6/1998 | Shalev | |
| 5,811,737 A | 9/1998 | Gaiski | |
| 5,811,738 A | 9/1998 | Boyovich et al. | |
| 5,850,757 A | 12/1998 | Wierenga | |
| 5,880,410 A | 3/1999 | Neuman | 177/187 |
| 5,884,232 A * | 3/1999 | Buder | 702/42 |
| 6,118,083 A | 9/2000 | Boyovich et al. | |
| 6,148,667 A | 11/2000 | Johnson | |
| 6,186,657 B1 | 2/2001 | Fuchsbichler | 366/165.4 |
| 6,242,701 B1 | 6/2001 | Breed et al. | |
| 6,284,987 B1 | 9/2001 | Al-Modiny | |
| 6,313,414 B1 | 11/2001 | Campbell | |
| 6,384,349 B1 | 5/2002 | Voll | |
| 6,474,926 B2 | 11/2002 | Weiss | 414/332 |
| 6,495,774 B1 | 12/2002 | Pederson | |
| 6,532,830 B1 * | 3/2003 | Jansen et al. | 73/862.042 |
| 6,769,315 B2 | 8/2004 | Stevenson et al. | |
| 6,928,886 B2 * | 8/2005 | Meusel et al. | 73/862.324 |
| 6,948,535 B2 | 9/2005 | Stegemoeller | 141/67 |
| 7,048,432 B2 | 5/2006 | Phillippi et al. | 366/164.1 |
| 7,202,425 B2 | 4/2007 | Knudsen et al. | |
| 7,214,028 B2 | 5/2007 | Boasso | 414/812 |
| 7,214,892 B2 | 5/2007 | Williamson | 177/170 |
| 7,240,549 B2 | 7/2007 | Kimbara et al. | |
| 7,267,001 B1 | 9/2007 | Stein | |
| 7,353,875 B2 | 4/2008 | Stephenson et al. | 166/305.1 |
| 7,528,329 B2 | 5/2009 | Nuyts | |
| 2001/0038018 A1 | 11/2001 | Bell et al. | 222/58 |
| 2003/0202869 A1 | 10/2003 | Posch | 414/498 |
| 2005/0110648 A1 * | 5/2005 | Lehrman et al. | 340/686.1 |
| 2007/0125543 A1 | 6/2007 | McNeel et al. | 166/308.3 |
| 2007/0201305 A1 | 8/2007 | Heilman et al. | 366/141 |
| 2008/0066911 A1 | 3/2008 | Luharuka et al. | 166/283 |
| 2008/0271927 A1 | 11/2008 | Crain | |
| 2009/0107734 A1 | 4/2009 | Lucas et al. | |

FOREIGN PATENT DOCUMENTS

| | | |
|---|---|---|
| DE | 295 18 215 U1 | 5/1996 |
| WO | WO 94/19263 | 9/1994 |

OTHER PUBLICATIONS

U.S. Appl. No. 11/930,756, filed Oct. 31, 2007, Lucas et al.
Office Action in U.S. Appl. No. 11/930,756.
Boerger pump—available at: http://www.boerger-pumps.com/contero/gallery/Prospekte_USA/us_p_ssr_boerger_powerfeed_0309.pdf.
Office Action in U.S. Appl. No. 11/741,509.
Advisory Action in U.S. Appl. No. 11/930,756.
Office Action for U.S. Appl. No. 11/930,756, dated Jul. 7, 2009.
Office Action for U.S. Appl. No. 11/741,509, dated Aug. 19, 2009.
Office Action from U.S. Appl. No. 11/930,756, dated May 27, 2010.

* cited by examiner

APPARATUS AND METHODS FOR MANAGING EQUIPMENT STABILITY

BACKGROUND

Oil field operations often entail the use of numerous storage tanks and other equipment. Storage tanks may be used to store the solid materials or the fluids that are used in the various stages of an oil field operation. For instance, sand bins may be used for handling the sand inventory on an oil field. However, such storage units are often tall, making them susceptible to tipping over due to instability.

Various factors may lead to instability of a storage tank on the field. For instance, instability may result from uneven settlement or leaning due to slope. Additionally, wind loads, uneven loading, or ancillary equipment forces may contribute to instability of a storage tank.

Earlier attempts use inclinometers to indicate whether a storage tank is leaning due to slope or uneven settlement. An inclinometer measures the angle of slope (or tilt), elevation or inclination of an object with respect to gravity. However, inclinometers fail to monitor the potential instability resulting from eccentric loads due to factors such as wind loads, imbalanced loading, or ancillary equipment forces.

FIGURES

Some specific example embodiments of the disclosure may be understood by referring, in part, to the following description and the accompanying drawings.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

The present invention is directed to apparatus and methods for monitoring instability of equipment. Specifically, the present invention is directed to apparatus and methods for determining the instability of equipment by measuring the reaction forces at different points at the base of the equipment.

In one exemplary embodiment, the present invention is directed to a method of monitoring the instability of an equipment comprising: symmetrically arranging a plurality of load sensors at a base of the equipment; imposing a Cartesian coordinate system on the base of the equipment; wherein center of the base is origin of the Cartesian coordinate system, wherein the Cartesian coordinate system comprises an X-axis and a Y-axis, and wherein the X-axis and the Y-axis define a plane corresponding to the base of the equipment; designating Cartesian coordinates to each load sensor; determining a reaction force at each load sensor; and determining an overall instability factor for the equipment from the Cartesian coordinates of each load sensor and the reaction force at that load sensor.

In another exemplary embodiment, the present invention is directed to a system for monitoring instability of an equipment comprising: a plurality of load sensors symmetrically arranged on a base of the equipment; an information handling system coupled to the plurality of load sensors, wherein the information handling system determines an overall instability factor for the equipment, and wherein the overall instability factor is determined based on reaction forces at the plurality of load sensors.

The features and advantages of the present disclosure will be readily apparent to those skilled in the art upon a reading of the description of exemplary embodiments, which follows.

DESCRIPTION

The present invention is directed to apparatus and methods for monitoring instability of equipment. Specifically, the present invention is directed to apparatus and methods for determining the instability of equipment by measuring the reaction forces at different points at the base of the equipment.

Figure 1:
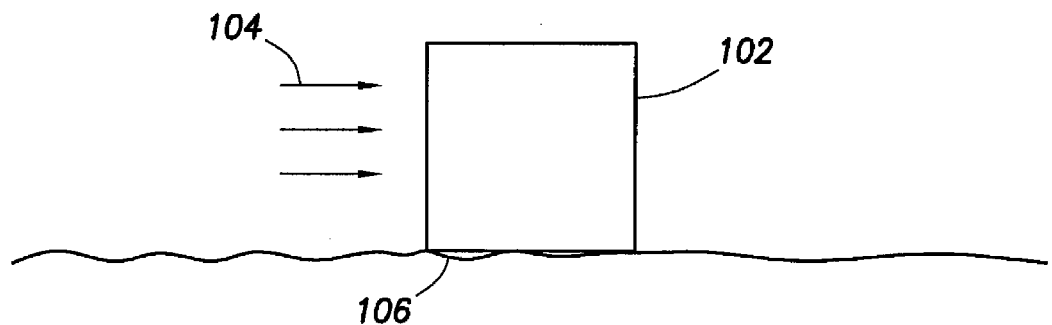
FIG. 1 is a side view of a storage tank depicting some of the factors that may cause instability.

The details of the present invention will now be discussed with reference to the figures. FIG. 1 depicts some of the factors that may lead to instability of a storage tank 102 on the field. Specifically, the wind loads 104 on the storage tank 102 and the uneven terrain 106 may contribute to instability of the storage tank 102. As would be appreciated by those of ordinary skill in the art, with the benefit of this disclosure, additional factors (not shown) such as off-axis or imbalanced loading and settlement or subsidence may also contribute to instability of the storage tank 102.

Figure 2:
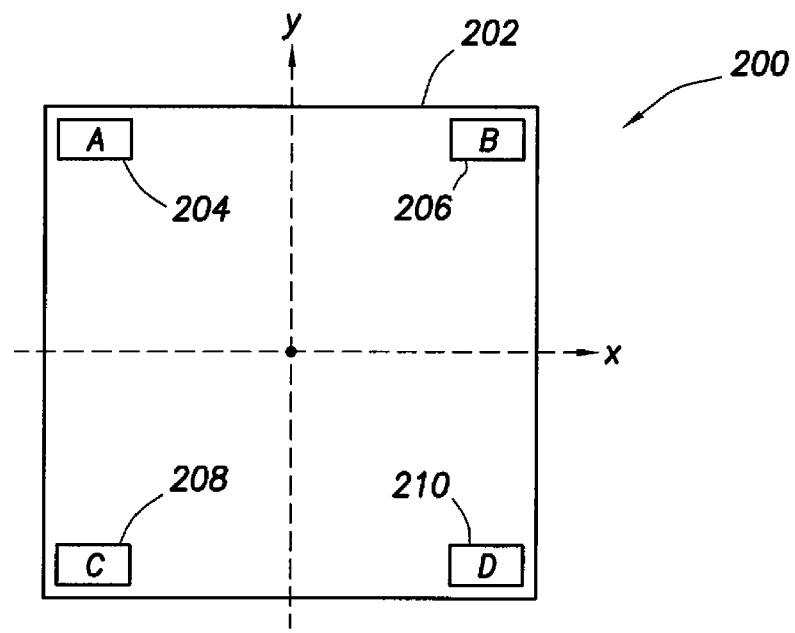
FIG. 2 is a bottom view of a storage tank with load sensors in accordance with a first exemplary embodiment of the present invention.

Turning to FIG. 2, a Tank Instability Detection System (TIDS) in accordance with an exemplary embodiment of the present invention is depicted generally by reference numeral 200. In this exemplary embodiment, the TIDS is arranged on a storage tank 202 having a square cross-sectional area at its base. Load sensors A 204, B 206, C 208 and D 210 are symmetrically arranged near the perimeter at the base of the storage tank 202. In an exemplary embodiment, load cells are used as load sensors to determine the force exerted by gravity on the storage tank 202. Electronic load cells are preferred for their accuracy and are well known in the art, but other types of force-measuring devices may be used. As will be apparent to one skilled in the art, however, any type of load-sensing device can be used in place of or in conjunction with a load cell. Examples of suitable load-measuring devices include weight-, mass-, pressure- or force-measuring devices such as hydraulic load cells, scales, load pins, dual sheer beam load cells, strain gauges and pressure transducers. Standard load cells are available in various ranges such as 0-5000 pounds, 0-10000 pounds, etc.

Figure 3:
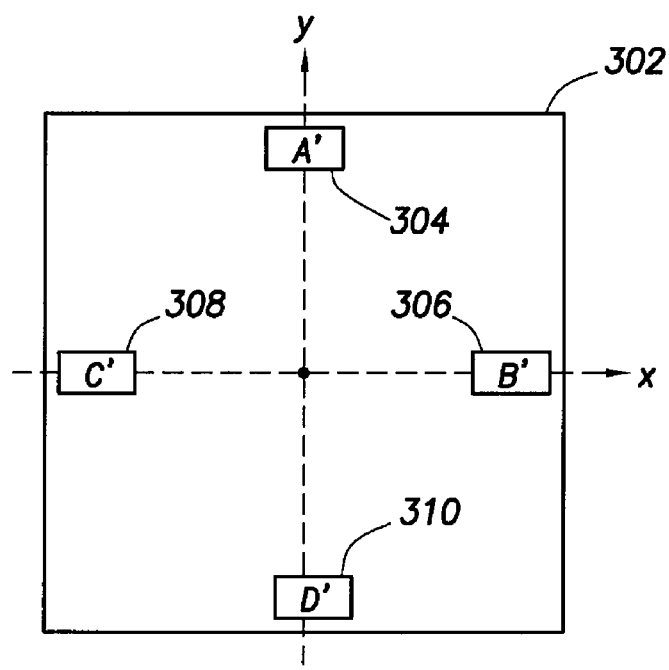
FIG. 3 is a bottom view of a storage tank with load sensors in accordance with a second exemplary embodiment of the present invention.

As would be appreciated by those of ordinary skill in the art, with the benefit of this disclosure, the load sensors A 204, B 206, C 208 and D 210 may be arranged in a number of different arrangements as long as they are arranged symmetrically. An arrangement of load sensors is considered symmetrical if when the reaction forces are evenly distributed between the load sensors, the resulting reaction force acts through the center of the base (and hence, the center of the load cell pattern) and the instability is zero. For instance, FIG. 3 depicts an alternate symmetrical arrangement of the load sensors A' 304, B' 306, C' 308 and D' 310 on the base of a storage tank 302 with a square cross-sectional area. Moreover, as would be appreciated by those of ordinary skill in the art, with the benefit of this disclosure, the number of load sensors used may be changed depending on the design requirements. Furthermore, as would be appreciated by those of ordinary skill in the art, with the benefit of this disclosure, in order to achieve symmetry, the distribution of the load sensors may vary depending on the shape of the base of the storage tank.

A simple mathematical processor may manipulate the output of the load sensors to determine the effective center of gravity of base reaction forces. If the effective center of gravity of the base reaction forces lies within the boundaries of the perimeter supports where the load cells are located, then the tank is stable. However as the effective center of gravity of the base reaction forces approaches the support boundaries, the tank becomes more likely to become unstable. When the effective center of gravity of the base reaction forces crosses the support boundary and lies outside the supports, the tank is unstable and likely in the process of overturning. An instability factor is used to represent the potential for tipping. Because the load sensors are symmetrically arranged, when the reaction forces experienced at the load sensors are perfectly symmetrical, the total reaction force acts through the center of the base and the instability is zero. In contrast, when the effective center of gravity of the reaction forces is at the perimeter of the base, the instability factor is 1. Consequently, a user can constantly monitor the stability of the storage tank by tracking the instability factor which is output by the system.

In one exemplary embodiment, a particular instability factor may be preset as the designated threshold instability factor. In this embodiment, an alert in the form of an alarm or other appropriate notification mechanism may be utilized to notify the user when the instability factor exceeds the designated threshold instability factor. In one exemplary embodiment, the system may notify the user that the designated threshold instability factor is reached by transmitting a signal from the system to the user, who may be at a remote location. As would be appreciated by those of ordinary skill in the art, with the benefit of this disclosure, the signal may be transmitted over a wired or wireless network.

Returning now to FIG. 2, in this exemplary embodiment, the load sensors A 204, B 206, C 208 and D 210 are positioned at the four corners of the perimeter at the base of the storage tank 202. A Cartesian coordinate system is imposed on the base so that the center of the base is the origin. The Z-axis is the vertical component (coming out of the paper in FIG. 2) and the X and Y axis are in the horizontal plane. Although in reality, the load sensors A 204, B 206, C 208 and D 210 will probably be located slightly above the X and Y plane on the Z-axis, it is assumed that in this exemplary embodiment, the load sensors A 204, B 206, C 208 and D 210 are located at the origin with respect to the Z-axis. Accordingly, the X and Y coordinates of each of the load sensors A 204, B 206, C 208 and D 210 are determined for the system geometry. In the exemplary embodiment depicted in FIG. 2, load sensor A 204 is located at [−1,1], load sensor B 206 is located at [1,1], load sensor C 208 is located at [−1,−1] and load sensor D is located at [1,−1].

The instability factors for the X and Y direction are denoted as $I_X$ and $I_Y$, respectively, and are determined by multiplying the reaction forces at each load sensor by the respective coordinates to obtain the relative reaction force at each load sensor and summing the resulting relative reaction forces. Specifically, assuming that $F_A$, $F_B$, $F_C$ and $F_D$ are the reaction forces at the load sensors A 204, B 206, C 208 and D 210, respectively, the instability factors $I_X$ and $I_Y$ are obtained using the following equations:

$$I_X = (-F_A + F_B - F_C + F_D)/(F_A + F_B + F_C + F_D)$$

$$I_Y = (F_A + F_B - F_C - F_D)/(F_A + F_B + F_C + F_D)$$

Using the instability factors in the X and Y directions on the rectangular geometry, the overall instability factor, $I_A$ may be determined by the following logic:

If $|I_X| \geq |I_Y|$ then $I_A = |I_X|$ else $I_A = |I_Y|$

Figure 4:
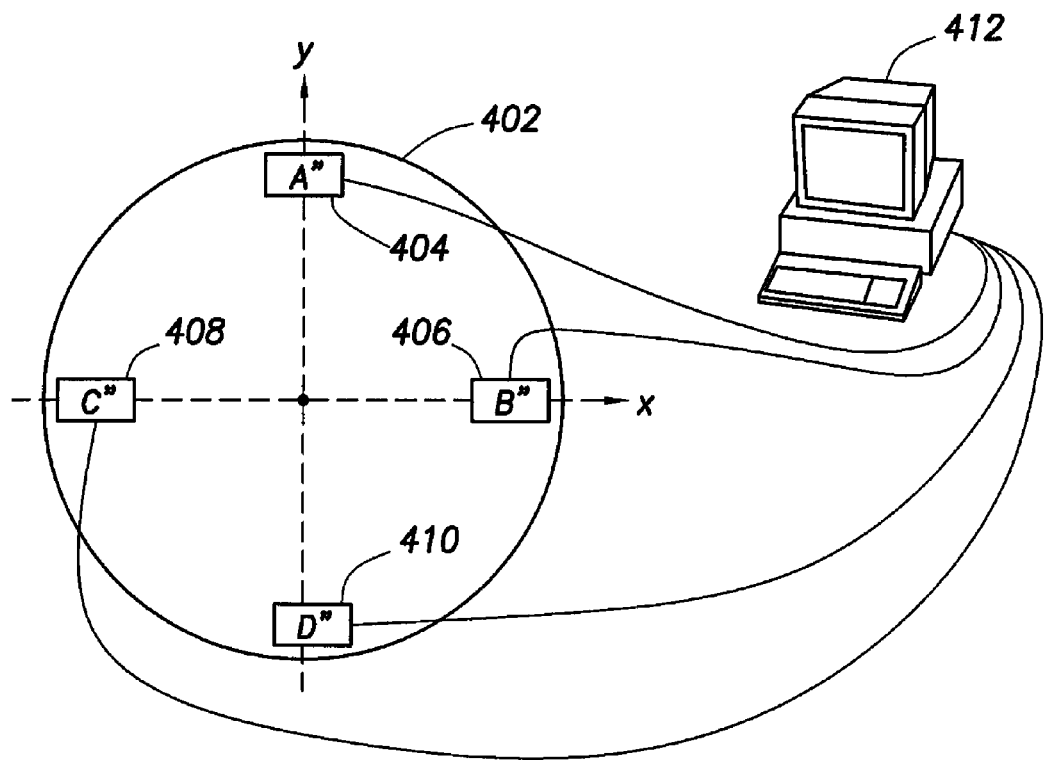
FIG. 4 is a bottom view of a storage tank with load sensors in accordance with a third exemplary embodiment of the present invention.

As would be appreciated by those of ordinary skill in the art, with the benefit of this disclosure, the same principle may be applied to other geometries by varying the equation used. For instance, FIG. 4 depicts a storage tank 402 with a circular cross-sectional area at its base having a TIDS—load sensors A" 404, B" 406, C" 408 and D" 410—in accordance with an exemplary embodiment of the present invention. The instability factors for the X ($I_X$) and Y ($I_Y$) directions are calculated using the equations discussed above. In this embodiment, the following equation is then used to deduce the overall instability factor ($I_A$) using $I_X$ and $I_Y$:

$$I_A = (I_X^2 + I_Y^2)^{1/2}$$

As would be appreciated by those of ordinary skill in the art, with the benefit of this disclosure, the calculation of the overall instability factor $I_A$ quantifies the instability of the storage tank system thereby providing an early indication of instability and opportunities to help manage and/or eliminate the risks involved.

Further, as depicted in FIG. 4, in one exemplary embodiment, the load sensors A" 404, B" 406, C" 408 and D" 410 may be coupled to an information handling system 412. Although FIG. 4 depicts a personal computer as the information handling system 412, as would be apparent to those of ordinary skill in the art, with the benefit of this disclosure, the information handling system 412 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system may be a network storage device, or any other suitable device and may vary in size, shape, performance, functionality, and price. The information handling system may use the methods disclosed herein to process the load sensor readings and calculate the overall instability factor. Moreover, as would be appreciated by those of ordinary skill in the art, with the benefit of this disclosure, the load sensors A" 404, B" 406, C" 408 and D" 410 may be communicatively coupled to the information handling system 412 through a wired connection (as shown) or a wireless network (not shown).

Although the present invention is disclosed in the context of storage tanks, as would be appreciated by those of ordinary skill in the art, with the benefit of this disclosure, the apparatus and methods described herein may be used in conjunction with any other storage units or other mobile or stationary equipment where stability is desirable. For instance, the present apparatus and methods may be used in conjunction with a loaded platform, cranes, fork lifts, etc. Moreover, it would be appreciated by those of ordinary skill in the art, with the benefit of this disclosure, that although the present invention is disclosed in conjunction with a storage tank resting on a base, the same principle may be applied to equipments standing on support legs or wheels.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method of monitoring the instability of an equipment comprising:
    symmetrically arranging a plurality of load sensors at a base of the equipment;
    imposing a Cartesian coordinate system on the base of the equipment;
    wherein center of the base is origin of the Cartesian coordinate system,
    wherein the Cartesian coordinate system comprises an X-axis and a Y-axis, and
    wherein the X-axis and the Y-axis define a plane corresponding to the base of the equipment;
    designating Cartesian coordinates to each load sensor;
    determining a reaction force at each load sensor; and
    determining an overall instability factor for the equipment from the Cartesian coordinates of each load sensor and the reaction force at that load sensor.

2. The method of claim 1, wherein the step of determining an overall instability factor for the equipment using the Cartesian coordinates of each load sensor and the reaction force at that load sensor comprises:
    determining a first instability factor in the direction of the X-axis;
    determining a second instability factor in the direction of the Y-axis; and
    determining the overall instability factor using the first instability factor and the second instability factor.

3. The method of claim 2, wherein determining the first instability factor comprises:
    multiplying the reaction force at each load sensor by Cartesian coordinate of the load sensor on the X-axis to obtain a first relative reaction force at the load sensor;
    obtaining a sum of the first relative reaction forces at the load sensors; and
    dividing the sum of the first relative reaction forces at the load sensors by a sum of the reaction forces at the load sensors.

4. The method of claim 2, wherein determining the second instability factor comprises:
    multiplying the reaction force at each load sensor by Cartesian coordinate of the load sensor on the Y-axis to obtain a second relative reaction force at the load sensor;
    obtaining a sum of the second relative reaction forces at the load sensors; and
    dividing the sum of the second relative reaction forces at the load sensors by a sum of the reaction forces at the load sensors.

5. The method of claim 2, wherein for a rectangular base, the step of determining the overall instability factor using the first instability factor and the second instability factor comprises:
    determining an absolute value of the first instability factor;
    determining an absolute value of the second instability factor; and
    designating the greater of the absolute value of the first instability factor and the absolute value of the second instability factor as the overall instability factor.

6. The method of claim 2, wherein for a circular base, the step of determining the overall instability factor using the first instability factor and the second instability factor comprises determining the square root of the sum of the first instability factor squared and the second instability factor squared.

7. The method of claim 1, wherein the load sensor is selected from the group consisting of an electronic load cell, a hydraulic load cell, a scale, a load pin, a dual sheer beam load cell, a strain gauge, a pressure transducer and combinations thereof.

8. The method of claim 1, further comprising:
    designating a threshold overall instability factor; and
    providing an alert if the overall instability factor exceeds the threshold overall instability factor.

9. The method of claim 8, wherein the step of providing an alert if the overall instability factor exceeds the threshold overall instability factor comprises sounding an alarm.

10. The method of claim 8, wherein the step of providing an alert if the overall instability factor exceeds the threshold overall instability factor comprises transmitting a signal to a user at a remote location.

11. The method of claim 10, wherein the step of transmitting a signal to a user at a remote location comprises transmitting the signal over a wireless network.

12. The method of claim 1, wherein the equipment is a storage tank.

13. A system for monitoring instability of an equipment comprising:
    a plurality of load sensors symmetrically arranged on a base of the equipment;
    an information handling system coupled to the plurality of load sensors,
    wherein the information handling system determines an overall instability factor for the equipment, and
    wherein the overall instability factor is determined based on reaction forces at the plurality of load sensors.

14. The system of claim 13, wherein the equipment comprises a storage tank.

15. The system of claim 13, wherein the load sensor is selected from the group consisting of an electronic load cell, a hydraulic load cell, a scale, a load pin, a dual sheer beam load cell, a strain gauge, a pressure transducer and combinations thereof.

16. The system of claim 13, further comprising a notification mechanism, wherein the notification mechanism provides an alert if the overall instability factor exceeds a preset threshold overall instability factor.

17. The system of claim 16, wherein the notification mechanism comprises an alarm.

18. The system of claim 17, further comprising a network for transmitting the alarm to a user at a remote location.

19. The method of claim 18, wherein the network comprises a wireless network.

20. The method of claim 18, wherein the network comprises a wired network.

* * * * *